United States Patent
Buchwald et al.

(10) Patent No.: US 7,239,624 B2
(45) Date of Patent: Jul. 3, 2007

(54) METHOD AND APPARATUS FOR ALLOWING COMMUNICATION UNITS TO UTILIZE NON-LICENSED TITLE SPECTRUM

(75) Inventors: Gregory J. Buchwald, Crystal Lake, IL (US); Lawrence M. Ecklund, Wheaton, IL (US); Richard S. Rachwalski, Lemont, IL (US); S. David Silk, Barrington, IL (US); Stephen L. Kuffner, Algonquin, IL (US)

(73) Assignee: Motorola, Inc., Schaumburg, IL (US)

( * ) Notice: Subject to any disclaimer, the term of this patent is extended or adjusted under 35 U.S.C. 154(b) by 512 days.

(21) Appl. No.: 10/973,530

(22) Filed: Oct. 26, 2004

(65) Prior Publication Data

US 2006/0088010 A1    Apr. 27, 2006

(51) Int. Cl.
*H04Q 7/20*    (2006.01)
(52) U.S. Cl. .................. 370/338; 370/433; 370/329; 455/450; 455/509; 348/725; 375/346
(58) Field of Classification Search ................ 370/338, 370/433, 329; 455/450, 509; 348/725; 375/346
See application file for complete search history.

(56) References Cited

U.S. PATENT DOCUMENTS

| 5,050,238 | A |   | 9/1991  | Tomizuka et al. |
| 5,850,596 | A | * | 12/1998 | Reynolds ............... 455/63.1 |
| 6,275,506 | B1 | * | 8/2001 | Fazel et al. .............. 370/478 |
| 6,512,928 | B1 | * | 1/2003 | Janky et al. ............ 455/456.6 |
| 6,583,825 | B1 | * | 6/2003 | Yuen et al. ............... 348/731 |
| 6,941,110 | B2 | * | 9/2005 | Kloper et al. ........... 455/67.11 |
| 7,206,279 | B2 | * | 4/2007 | Taga et al. ............... 370/208 |
| 2003/0023978 | A1 | * | 1/2003 | Bajgrowicz ............... 725/68 |
| 2004/0203825 | A1 | * | 10/2004 | Daniel et al. ............ 455/452.1 |
| 2005/0025265 | A1 | * | 2/2005 | E'Amico et al. .......... 375/346 |
| 2006/0067354 | A1 | * | 3/2006 | Waltho et al. ............. 370/433 |
| 2006/0148482 | A1 | * | 7/2006 | Mangold ................ 455/450 |

* cited by examiner

*Primary Examiner*—Danh Le

(57) ABSTRACT

The presence of the non-television transmission within a channel is used to indicate that secondary non-licensed usage of the channel is permitted. Specifically, if secondary users incorporate the means to identify the unique modulation signature of the secondary user, decoding of a beacon signal may not be necessary. With the above in mind, a radio will be prevented from transmitting within a frequency band when no transmission within the licensed spectrum is currently taking place; the licensee is currently transmitting on the spectrum (e.g., television transmissions are taking place utilizing the spectrum, or the radio cannot sense the presence of a data channel (beacon).

18 Claims, 4 Drawing Sheets

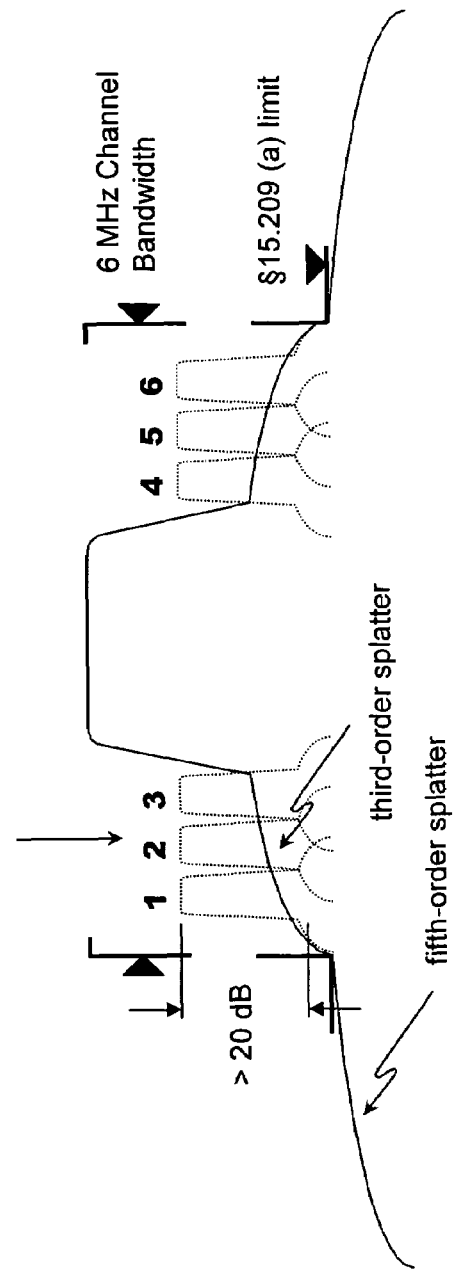

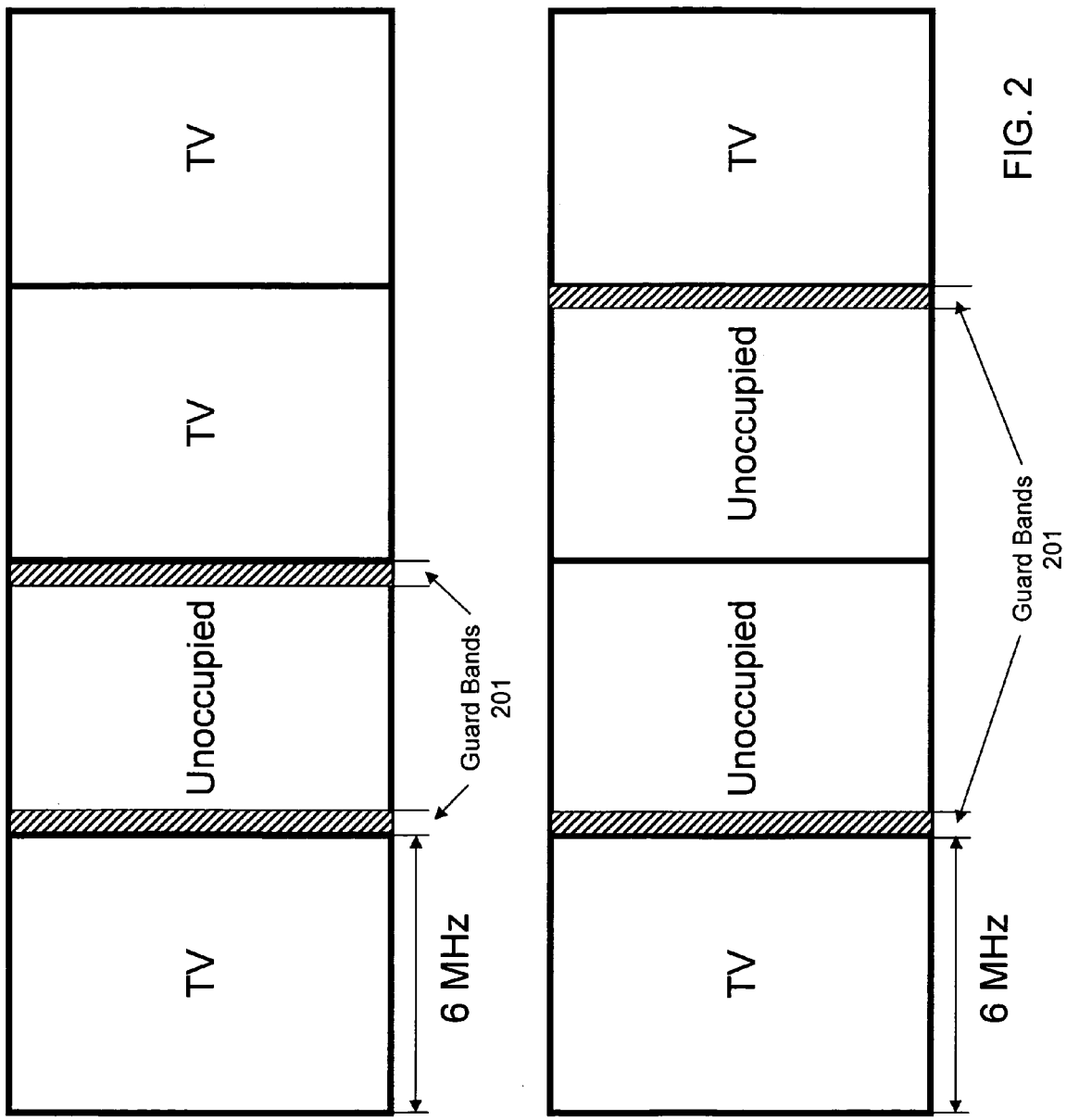

400

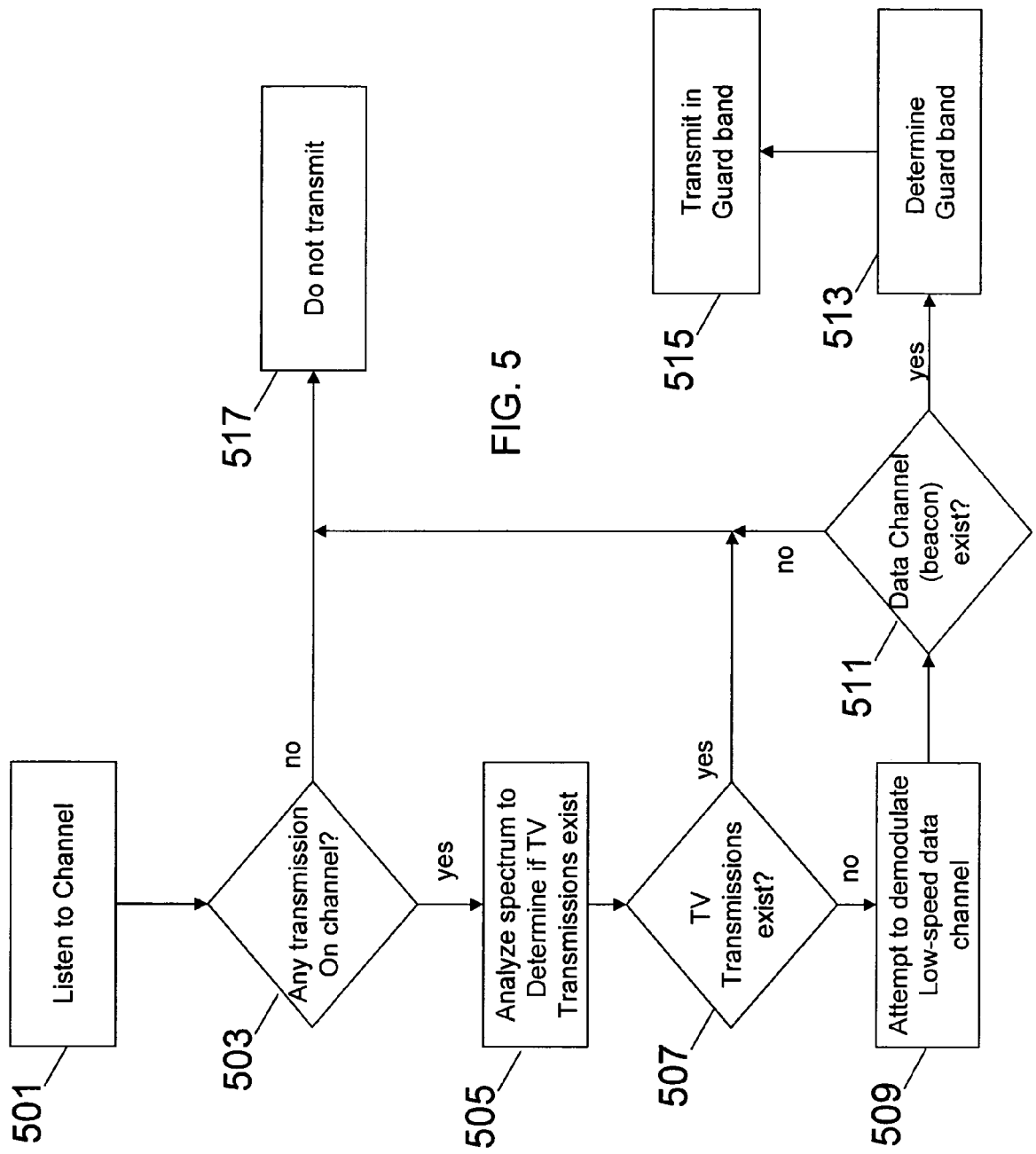

METHOD AND APPARATUS FOR ALLOWING COMMUNICATION UNITS TO UTILIZE NON-LICENSED TITLE SPECTRUM

FIELD OF THE INVENTION

The present invention relates generally to wireless communications, and in particular, to a method and apparatus for allowing communication units to utilize non-licensed spectrum.

BACKGROUND OF THE INVENTION

The Federal Communications Commission (FCC) of the United States of America has proposed allowing non-licensed devices to operate in the broadcast television spectrum at locations where the spectrum is not in use by television broadcasters. The FCC has proposed the use of a control signal, or beacon, to identify non-licensed users that have the right to transmit within the licensed spectrum. If a beacon is not present on the channel, and no transmissions are taking place, then non-licensed devices are not permitted to operate unless direct access to a central database can be obtained identifying the spectrum as unused. Access to the database may be via wired, wireless, or other robust method. Thus, it is assumed that all parties wishing to transmit within the licensed television spectrum would either check a centralized database, or receive and decode the beacon signal to determine if they can transmit within the licensed television spectrum. Once transmission begins, a beacon signal must be transmitted by the user in order to identify the user.

Because devices wishing to transmit within the licensed television spectrum would need to presumably transmit a beacon signal, and/or access the centralized database, all devices wishing to transmit within the spectrum would need to include added circuitry to do so. This would increase the cost and complexity of any device wishing to utilize the licensed television spectrum. Therefore, a need exists for a method and apparatus for allowing non-licensed communication units to utilize the spectrum, yet not have the added cost of containing circuitry to transmit a beacon signal and/or access the centralized database.

BRIEF DESCRIPTION OF THE DRAWINGS

FIG. 1 illustrates a beacon format.
FIG. 2 illustrates blocks of licensed spectrum.
FIG. 3 illustrates transmission within guard bands of a transmission.
FIG. 5 is a flow chart showing operation of the radio communication unit of FIG. 1.

DETAILED DESCRIPTION OF THE DRAWINGS

Figure 4:
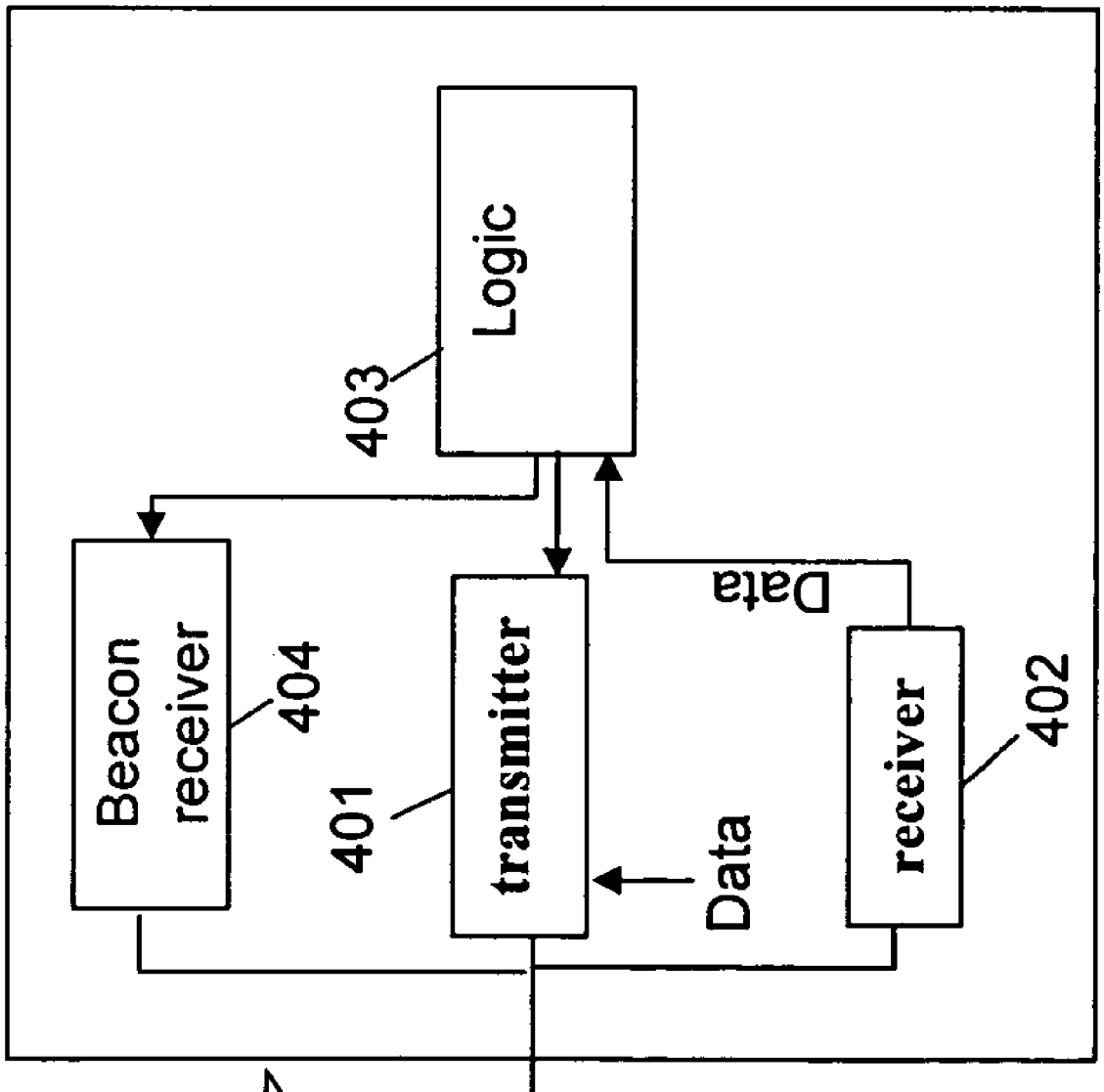
FIG. 4 is a block diagram of a radio communication unit.

To address the above-mentioned need a method and apparatus for allowing communication units to utilize non-licensed spectrum is provided herein. In particular, the presence of non-television transmission within a channel is used to indicate that secondary non-licensed usage of the channel is permitted. Specifically, if secondary users incorporate the means to identify the unique modulation signature of the secondary user, decoding of a beacon signal may not be necessary. With the above in mind, a radio will be prevented from transmitting within a frequency band when no transmission within the licensed spectrum is currently taking place; the licensee is currently transmitting on the spectrum (e.g., television transmissions are taking place utilizing the spectrum, or the radio cannot sense the presence of a data channel (beacon).

The present invention encompasses a method for allowing a communication unit to utilized non-licensed spectrum. The method comprises the steps of determining if any transmissions are taking place within the non-licensed spectrum, determining if any transmissions taking place within the non-licensed spectrum are by a licensed user of the spectrum, and determining if a beacon exists within the non-licensed spectrum. Transmission within the non-licensed spectrum takes place only when transmissions are taking place within the non-licensed spectrum, the licensed user of the spectrum is not transmitting, and when a beacon exists.

The present invention additionally encompasses a method for allowing a communication unit to utilized television spectrum. The method comprises the steps of determining if any transmissions are taking place within the television spectrum, determining if a television broadcast is taking place within the television spectrum, and determining if a beacon exists within the television spectrum. Transmissions within the television spectrum take place only when transmissions are taking place within the television spectrum, the television broadcast is not taking place, and when a beacon exists.

Finally, the present invention encompasses an apparatus comprising logic circuitry determining if any transmissions are taking place within non-licensed spectrum, determining if any transmissions taking place within the non-licensed spectrum are by a licensed user of the spectrum, and determining if a beacon exists within the non-licensed spectrum. A transmitter is provided for transmitting within the non-licensed spectrum only when transmissions are taking place within the non-licensed spectrum, the licensed user of the spectrum is not transmitting, and when a beacon exists.

Inherent in any communication system utilizing licensed television spectrum is a tiered service structure, where the owner of the licensed spectrum has ultimate rights to transmit within that spectrum. Their transmission within the spectrum prevents all others from utilizing the spectrum. If, however, the owner of the spectrum is not transmitting within the spectrum, a user may transmit within the spectrum only if they have a higher priority than the current user of the spectrum. If no user is currently detected within the spectrum, a centralized database must be checked by non-licensed users to determine if a licensed user is currently utilizing the spectrum. In other words, simply because one cannot hear transmissions within the spectrum, does not mean that it is currently unused.

In order to determine a non-licensed user's priority, beacon 100 (shown in FIG. 1) is broadcast on a frequency within the frequency band by all users, and comprises low-speed data easily decoded by all secondary users. Non-licensed spectrum includes any spectrum in which a user is not licensed to utilize. Beacon 100 in the least comprises a priority level 101 of radio 100, and preferably comprises data identifying coordinates for exclusion 102, a radius for exclusion 103, the frequencies to be excluded 104 from use by others, frequencies 105 of additional beacon channels to be monitored, beacon transmitter height 106, and suspend/resume operation flag 107. When a user wishes to transmit within the non-licensed (e.g., television) spectrum, the user must first determine if anyone is transmitting within the spectrum, and if not, the user must check the centralized database to confirm. It is assumed that non-licensed users will have some form of backhaul link and must register use of the channel with a central database and regularly poll the central database to ensure continued use.

If someone is already transmitting in non-licensed spectrum, a non-licensed user may transmit within the spectrum only if their priority level 101 is higher than the current user of the spectrum. (It should be noted that users with the highest priority (e.g., emergency services) may not need to broadcast a beacon at all. Their transmission within the spectrum (without a beacon) will automatically reserve the spectrum for their use).

It should be noted that there exist dozen of potential TV channels which could be utilized. A beacon, based on current 2-way radio standards, might be located within each unused TV channel; occupying one of at least 480 potential locations, based on 12.5 kHz channel spacing. It is clear that literally thousands of channels must be scanned to find a beacon. In order to address this issue, only 3 potential locations of such a beacon within each TV channel is allowed, namely the center of a single channel, odd multiple of aggregate channels, or the edge of a TV aggregate even number of TV channels. It is clear that a tremendous advantage is enabled by such a beacon placement, in that only a few dozen spectral locations need be sensed, as opposed to thousands of channels in blind beaconing systems. The time to capture a channel is substantially reduced by this method. Thus, the step of determining if the beacon exists within the non-licensed spectrum comprises the step of analyzing a center of a single channel, an odd multiple of aggregate channels, or an edge of an aggregate even number of channels to determine if the beacon exists.

As discussed above, the transmission of a beacon and/or the ability to check a centralized database would increase the cost and complexity of any non-licensed device wishing to utilize the spectrum. In order to address this issue, in the preferred embodiment of the present invention a method and device is provided for allowing communication units to utilize the spectrum, yet not have the added cost of containing circuitry to receive and decode a beacon signal or access the centralized database. Transmissions by such devices operate at the broadcast channel edges without interfering with the any existing transmissions. This allows for efficient use of spectral resources and coexistence of two distinct forms of non-licensed operation. This is illustrated in FIG. 2.

As shown in FIG. 2, television spectrum comprises frequency blocks of 6 MHz. During operation, lower-priority users will transmit within guard bands 201 of unoccupied spectrum, with only two guard bands 201 being available for every contiguous block of unoccupied spectrum. It should be noted that while the guard bands illustrated in FIG. 2 appear to comprise bands of equal frequency, one of ordinary skill in the art will recognize that this does not need to be the case. For example, two guard bands may exist, with a first guard band occupying twice as much frequency as a second guard band.

Given the FCC's proposed transmit power levels for fixed and portable equipment, the conservative spectral mask requirements, the spectral splatter generated from the transmitter power amplifier, and the need for operation over a large range of frequencies, it is likely that non-licensed users of the television spectrum will only operate over a fraction of the bandwidth of a given 6 MHz broadcast channel. Lower-priority portables wishing to utilize television spectrum, but not as part of the any system occupying the channel, can operate at the broadcast channel edges without interfering with the current user of the spectrum.

As an example of a practical system implementation, consider a system that has established operation on a vacant channel employing orthogonal frequency division multiplexing (OFDM) achieving 3 bps/Hz spectral efficiency and only occupying the center 2 MHz of the broadcast channel. An analysis suggests that a signal of this bandwidth would comprise third- and fifth-order spectral splatter components occupying ±3 MHz and ±5 MHz, respectively, from the channel center and will still meet the FCC suggested spectral mask requirements (47CFR §15.209(a)). Provided that lower-priority devices (such as portable-to-portable non-licensed systems, wireless microphone systems, or other like devices) can achieve satisfactory performance while operating in an environment that is not thermal noise limited and can maintain off-channel emissions of at least 20 dB below their respective maximum pass band emissions (similar to 47CFR §15.247(c) where both pass-band and off-channel emissions are measured in a 100 kHz bandwidth), then as it is plausible that several sub-channels supporting devices employing a robust modulation format could be realized. This is illustrated in FIG. 3.

As a further example of a practical system implementation, consider a system employing an IEEE802.16-like transmission format utilizing OFDM and a transmit bandwidth that is scalable in 1.5 MHz segments. Therefore, it is plausible that a transmit signal with a bandwidth of 3 MHz could be constructed by aggregating two 1.5 MHz segments while still maintaining the FCC suggested spectral mask requirements. As with the previous example, the remaining guard bands on either side of any non-licensed transmission could be utilized by secondary users. Furthermore, if additional transmitter pass-band filtering is employed, it is possible to increase the bandwidth of the transmission to 4.5 MHz. Even though this would reduce the guard bands to 750 kHz on each side of the transmission, the guard bands would still be large enough to support secondary users.

FIG. 4 is a block diagram of communication unit 400. In the preferred embodiment of the present invention communication unit 400 is a low-priority unit (such as an IEEE Adaptive Communication Device) capable of transmitting and receiving communication within the television spectrum band. Such a radio 400 may comprise any stationary or portable radio such as, but not limited to a cellular telephone, radios participating within wireless area networks such as wireless equipment utilizing one of the IEEE 802 family of system protocols, medical telemetry equipment, wireless microphones, security systems, . . . , etc.

Radio 400 comprises transmitter 401, receiver 402, logic unit 403, and beacon receiver 404. Logic unit 403 preferably comprises a microprocessor controller, such as, but not limited to a Motorola PowerPC microprocessor. In the preferred embodiment of the present invention logic unit 403 serves as means for controlling radio 400, and as means for analyzing beacon contents to determine an ability to utilize non-licensed spectrum. Receive and transmit circuitry 401 and 402 are common circuitry known in the art for communication utilizing a well known communication system protocols, and serve as means for transmitting and receiving information/data. Beacon receiver serves as means for receiving beacon transmissions, and may be implemented as part of receiver 402, transmitter 401, or both.

Radio 400 does not broadcast a beacon, nor does it have the ability to check an external database to access to a central database to identify if the spectrum is being used. Thus, without the ability to access a centralized database, radio 400 must make sure that it does not transmit within the frequency band when:

The licensed entity is utilizing the frequency band; or

Very high-priority users (e.g., emergency service personnel) are utilizing the frequency band.

In the preferred embodiment of the present invention, the presence of the non-television transmission within a channel can be used to indicate that secondary non-licensed usage of the channel is permitted. Specifically, if secondary users incorporate the means to identify the unique modulation signature of the secondary user, decoding of the beacon signal may not be necessary. With the above in mind, radio 400 will be prevented from transmitting within the licensed frequency band when:

No transmission within the licensed spectrum is currently taking place; unless rules allow use of the spectrum in a cognitive fashion, by means of a feature detection unit, and, at substantially reduced power.

The licensee is currently transmitting on the spectrum (e.g., television transmissions are taking place utilizing the spectrum; or Radio 400 cannot sense the presence of a data channel (beacon).

By preventing communication by radio 400 when the above three situations are detected, radio 400 will be assured to communicate within the licensed spectrum when a non-licensed user is utilizing the spectrum. As discussed, all transmissions by radio 400 will occur in guard bands 201.

FIG. 5 is a flow chart showing operation of radio 400 prior to any transmission within the non-licensed television spectrum. The logic flow begins at step 501 where logic circuitry 403 accesses receiver 402 to listen to the non-licensed frequency band (spectrum). At step 503 logic circuitry 403 determines if any transmissions are taking place within the non-licensed spectrum. As discussed above, simply because transmissions are unheard, does not mean the licensed user is not currently occupying the frequency band. The only way to make sure that the licensed user is not currently using the frequency band is to access the external database. However, because radio 400 does not have the ability to do this, it cannot be assured no transmissions are taking place over the channel, even when none are heard. Therefore, if at step 503 it is determined that no transmissions are heard on the channel, the logic flow ends at step 517 with no transmission by radio 400 taking place over the channel.

If, however, transmissions are being made on the channel, radio 400 must determine if the transmissions are by the licensed user of the spectrum, or by higher tiered users. In either case transmissions on the channel will not occur by radio 400. Thus, if at step 503 it was determined that transmissions are being made, the logic flow continues to step 505 where the spectrum is analyzed by logic circuitry 403 to determine if the licensed user is occupying the frequency band. This is accomplished by determining if receiver 402 senses the presence of television transmissions within the frequency band. More particularly, a search is made for either the visual carrier (1.25 MHz +/−15 kHz from the lower edge of a television channel), an aural carrier located 5.75 kHz +/−15 kHz from the lower edge of a television channel) when National Television System Committee (NTSC)—analog television transmissions occupy the channel, or when the pilot carrier of an ATSC digital television (DTV) signal is sensed directly, or the presence of a DTV signal is determined through the use of pilot demodulation of the DTV signal—a more robust method of determine the presence of a 8VSB DTV signal. Detection of the above signals may be made by using an appropriate FFT sub-block (512 bit is sufficient), or by other means known in the field, which may be simpler or more difficult than the FFT method suggested. For example, a narrow band filter, passing energy at the visual and/or aural NTSC carriers, plus the pilot carrier for DTV, followed by a power detector/threshold circuit would comprise a simple means to determine the presence of a licensed TV signal.

The logic flow continues to step 507 where logic circuitry 403 determines if television transmissions exist, and if so, the logic flow ends at step 517. If, at step 507 it is determined that television transmissions do not exist, the logic flow continues to step 509 where receiver 402 and logic circuitry 403 attempt to demodulate the low-speed data channel (i.e., the beacon). As discussed above, all users (except highest tier users) must transmit a beacon in order to utilize the channel, thus, if transmissions occur, and a beacon is not sensed, it is assumed that the channel is unavailable for use in a non-licensed method. Therefore, at step 511 logic circuitry 403 determines if a data channel (beacon) exists, and if not the logic flow ends at step 517.

If, however, at step 511 it is determined that a data channel exists, the logic flow continues to step 513 where guard bands are determined. This is accomplished by demodulating the low speed data (beacon) transmitted within the transmission of the user occupying the center portion of the non-licensed TV channel; typically found at the center of the transmission, and decoding the information necessary to determine that signals overall occupied bandwidth. Of course, once the beacon is detected, one does not necessarily need to demodulate the beacon to determine the width of the guard bands; this can also be determined by actual measurement of the transmitted signal through the same FFT means described above. The logic flow continues to step 515 where transmission takes place (via transmitter 401) within the guard bands. As discussed transmitter 401 may utilize a cellular telephone system protocol, a wireless computer system protocol, a wireless computer utilizing the IEEE802.11 system protocol, a medical telemetry equipment system protocol, or a wireless microphone system protocol.

The above procedure allows transmission within the non-licensed spectrum only when transmissions are taking place within the non-licensed spectrum, the licensed user of the spectrum is not transmitting; and when a beacon exists. This allows users without access to the centralized database to use the non-licensed spectrum, yet prevents the users from interfering with licensed and high-tier users of the spectrum.

As discussed above, certain units (high-tier) will be directly tied to a data base which will allow other units not tied to the database to determine if it is possible to use the non-licensed channel. The transmission of units having database access enables the use of the spectrum by units not tied to the database (low-priority units). The low-priority units will transmit within the guard bands, as discussed above. Low-priority units will cease transmission when transmission by the units having access to the database ceases. Furthermore, a higher-tier user can shut down the secondary users indirectly by means of shutting down the higher-tier user through real time information provided to the database. Furthermore, secondary licensed users, such as Part 74 wireless microphone devices for television production, can also request the guard band region be extended, indicating to the higher-tier user through the database that additional guard band spectrum is temporarily required. The beacon can also indicate "guard band operation allowed" to other lower tiered users. In this way, television production can utilize the guard bands without necessarily shutting down a higher-tier user completely.

While the invention has been particularly shown and described with reference to a particular embodiment, it will be understood by those skilled in the art that various changes in form and details may be made therein without departing from the spirit and scope of the invention. Additionally, while the guard bands are illustrated above as being specific frequencies, one of ordinary skill in the art will recognize that the guard bands may occupy a specific code, timeslot, and/or frequency. The transmission on the guard band will then entail utilizing the particular code, timeslot, and/or frequency when transmission is allowed. It is intended that such changes come within the scope of the following claims.

The invention claimed is:

1. A method for allowing a communication unit to utilized non-licensed spectrum, the method comprising the steps of:
   determining if any transmissions are taking place within the non-licensed spectrum;
   determining if any transmissions taking place within the non-licensed spectrum are by a licensed user of the spectrum;
   determining if a beacon exists within the non-licensed spectrum; and
   transmitting within the non-licensed spectrum only when transmissions are taking place within the non-licensed spectrum, the licensed user of the spectrum is not transmitting, and when a beacon exists.

2. The method of claim 1 wherein the step of determining if any transmissions taking place within the non-licensed spectrum are by the licensed user of the spectrum comprises the step of determining if a television broadcast is being made within the non-licensed spectrum.

3. The method of claim 2 wherein the step of determining if the television broadcast is being made comprises the step of searching for a visual carrier and an aural carrier to determine if the television broadcast is being made.

4. The method of claim 2 wherein the step of determining if the television broadcast is being made comprises the step of searching for a digital television (DTV), ATSC, or an NTSC signal and determining if a DTV, ATSC, or NTSC signal is present.

5. The method of claim 1 wherein the step of transmitting comprises the steps of:
   determining guard bands for the non-licenses spectrum; and
   transmitting within the guard bands of the non-licensed spectrum.

6. The method of claim 1 wherein the step of transmitting comprises the step of transmitting via a radio taken from the group consisting of a cellular telephone, a wireless computer, a wireless computer utilizing one of the IEEE 802 family of system protocols, medical telemetry equipment, and a wireless microphone.

7. The method of claim 1 wherein the step of determining if the beacon exists within the non-licensed spectrum comprises the step of analyzing a center of a single channel, an odd multiple of aggregate channels, or an edge of an aggregate even number of channels to determine if the beacon exists.

8. A method for allowing a communication unit to utilized television spectrum, the method comprising the steps of:
   determining if any transmissions are taking place within the television spectrum;
   determining if a television broadcast is taking place within the television spectrum;
   determining if a beacon exists within the television spectrum; and
   transmitting within the television spectrum only when transmissions are taking place within the television spectrum, the television broadcast is not taking place, and when a beacon exists.

9. The method of claim 8 wherein the step of determining if the television broadcast is taking place comprises the step of searching for a visual carrier and an aural carrier to determine if the television broadcast is taking place.

10. The method of claim 8 wherein the step of determining if the television broadcast is taking place comprises the step of searching for a digital television (DTV) signal and determining if a DTV signal is present.

11. The method of claim 8 wherein the step of transmitting comprises the steps of:
   determining guard bands for the television spectrum; and
   transmitting within the guard bands of the television spectrum.

12. The method of claim 8 wherein the step of transmitting comprises the step of transmitting via a radio taken from the group consisting of a cellular telephone, a wireless computer, a wireless equipment utilizing one of the IEEE 802 family of system protocols, medical telemetry equipment, and a wireless microphone.

13. An apparatus comprising:
   logic circuitry determining if any transmissions are taking place within non-licensed spectrum, determining if any transmissions taking place within the non-licensed spectrum are by a licensed user of the spectrum, and determining if a beacon exists within the non-licensed spectrum; and
   a transmitter transmitting within the non-licensed spectrum only when transmissions are taking place within the non-licensed spectrum, the licensed user of the spectrum is not transmitting, and when a beacon exists.

14. The apparatus of claim 13 wherein the logic circuitry determines if any transmissions taking place within the non-licensed spectrum are by the licensed user of the spectrum by determining if a television broadcast is being made within the non-licensed spectrum.

15. The apparatus of claim 13 wherein the logic circuitry determines if the television broadcast is being made by searching for a visual carrier and an aural carrier.

16. The apparatus of claim 13 wherein the logic circuitry determines if the television broadcast is being made by searching for a digital television (DTV).

17. The apparatus of claim 13 wherein the transmitter transmits within guard bands of the non-licenses spectrum.

18. The apparatus of claim 13 wherein the transmitter comprises a transmitter taken from the group consisting of a cellular telephone, a wireless computer, a wireless equipment utilizing one of the IEEE 802 family of system protocols, medical telemetry equipment, and a wireless microphone.

* * * * *